Patented Oct. 5, 1954

2,690,957

UNITED STATES PATENT OFFICE 2,690,957

PROCESS FOR MAKING ALKALI METAL CYANATES OR ALKALI METAL THIOCYANATES

William P. ter Horst, Lewiston, N. Y., assignor to Mathieson Chemical Corporation, New York, N. Y., a corporation of Virginia No Drawing. Application November 21, 1950, Serial No. 196,940

9 Claims. (Cl. 23—75)

This invention relates to a continuous process for manufacturing alkali metal cyanates and thiocyanates from urea or thiourea and a carbonate of an alkali metal which provides commercial products of excellent purity, particularly with respect to cyanide content, in high yield.

Potassium cyanate has been manufactured and it has been proposed to make sodium cyanate by the reaction of urea with an alkali metal carbonate according to the following equation in which M represents an alkali metal:

$$2NH_2CONH_2 + M_2CO_3 = 2MCNO + 2NH_3 + CO_2 + H_2O$$

The reactants are mixed and heated. The cyanate product is usually recovered from the solid reaction mixture by crystallization from water. Yields by this batch process however are low and some additional loss by hydrolysis occurs during crystallization of the cyanate in the presence of water.

If the reaction mixture is heated to fusion temperature or above in an effort to promote the reaction, I have found that decomposition of the product occurs to an undesirable extent. Indeed with sodium cyanate, decomposition to the cyanide occurs to such an extent that yields of only 30 to 40 per cent are obtained. I have found however that excellent yields, i. e. 85 to 90 per cent and over may be obtained by heating the reaction mixture of the urea starting material and the alkali metal carbonate in particular proportions to a clear melt while removing the molten product as rapidly as possible from the reaction zone and cooling. At the same time, formation of the undesirable cyanide is minimized.

Although the reaction appears to begin at approximately 85° C. and improves with increase in temperature, I have found that in general the decomposition reaction also increases with temperature and it is markedly accelerated as the period of reaction time is increased. The decomposition reaction also is promoted by oxygen and most metals. I have found however that by rapidly heating the reaction mixture to a clear melt or fused state, substantially complete reaction is obtained and the molten product can be rapidly removed and cooled so as to prevent serious decomposition. By clear melt or fused state, I mean the molten state obtained by application of sufficient heat to carry the reaction mixture through the stage where the urea compound is melted and the carbonate is suspended therein and through the subsequent stage where the urea melt and suspended carbonate has rehardened to a solid agglomerate. The temperature at which the clear molten state is obtained varies with the particular carbonate employed. For example, the clear melt is obtained in the manufacture of potassium cyanate at about 350° C., whereas about 525° C. is required in the case of sodium cyanate and about 600° C. in the case of lithium cyanate.

A similar relationship obtains in the preparation of the alkali metal thiocyanates. A clear fusion forms at about 250–300° C. although the temperature may vary slightly depending on the proportions of the components. The maximum temperature for the fusion which avoids excessive loss by decomposition is about 350° C. but it is better to operate at lower temperatures. At temperatures below the fusion point, the reaction is slow and incomplete. At more elevated temperatures, the decomposition of the alkali metal thiocyanates is so serious as to make the manufacture unsatisfactory. The product then requires recrystallization to separate it from the alkali metal carbonate and other products formed by decomposition. After a clear fusion is obtained the product is cooled and solidified.

According to my invention, the urea starting material and carbonate of an alkali metal are introduced to the reaction zone in molar ratio of the urea starting material to the carbonate of between 2 and 3 to 1. I prefer to use about 2.3 to 1. Lower proportions of the urea starting material lead to reduced yields and higher proportions are unnecessarily expensive and do not appear to contribute to an increased yield. Cyanide content of the product is raised either by more of the urea starting material than about 3:1 or less than 2:1. A dry mixture of the urea starting material and the carbonate is advantageously prepared and heated to a clear melt where it is maintained for a period not exceeding about 5 minutes. Advantageously, of course, the process is conducted continuously by adding the solid urea starting material and the carbonate continuously as a dry mixture to the reaction melt and controlling the rate of liquid cyanate removal to limit its residence time in the reaction zone to about 2 to 5 minutes. I have found that residence time in the clear melt stage is critical and that at the fusion temperatures, the cyanate or thiocyanate in the fused mixture begins to decompose rapidly. Longer times are therefore to be avoided and shorter times are preferable. However, at lower temperatures somewhat longer times of fusion may be permissible and shorter times are essential at higher temperatures. For example, it is possible to heat sodium cyanate carefully in fusion for as much as 5 minutes at 535° C. without serious decomposition, but the heating time should not exceed 2 or 3 minutes at temperatures over 600° C.

It is of the utmost importance to obtain the highest possible cyanate content and to discontinue the reaction as nearly as possible when the cyanate content is at its peak. At the same time it is essential that the lowest possible cyanide content be present because of its toxic properties. Prior to my invention these requirements could not be successfully met in a practical commercial process.

The reaction mixture is heated to a minimum temperature at which the components form a clear melt or fusion. This is about 350° C. for potassium carbonate and urea but varies considerably with the metal of the carbonate and may vary slightly depending on the proportions of the components. The maximum temperature for the fusion which avoids excessive loss by decomposition also varies but it is advisable to operate at as low temperatures as possible and yet have a clear fluid melt. Ammonia, carbon dioxide and steam are evolved. With thiourea, temperatures of about 250–300° C. are preferred. At these temperatures the mixture becomes fluid, and ammonia, carbon dioxide, $H_2S$ and steam are evolved. The urea compound melts first and a suspension of the carbonate therein is first formed which hardens before fusion to the clear melt. Care should be taken to prevent loss of the urea compound from the fused portion by sublimation or volatilization. At temperatures below the fusion point, reaction tends to be slow and incomplete. The reaction is controlled by limiting the period of time in the fused state to about 5 minutes or less and cooling the fused material below its solidification point as rapidly as possible. In order to promote good admixture and contact in initiating the reaction, it is desirable to employ the starting materials in finely ground or powdered form.

The process advantageously is conducted continuously by feeding the reactants to the reaction zone and removing the liquid reaction product therefrom so that at any one time very little molten material is present in the reaction zone. As distinguished from batch processes known to the art, the yields are vastly improved and the quality of the product is so high that subsequent purification, previously necessary for many purposes, may be avoided. Operating according to my invention, snow white products may be obtained which contain a minimum of 85 per cent cyanate or thiocyanate and frequently as high as 95 per cent. The balance is usually carbonate with a small proportion, usually considerably less than 1 per cent of the cyanide. With thiourea, light colored alkali metal thiocyanates are usually obtained which contain a minimum of about 90% alkali metal thiocyanate and frequently as high as 98% thiocyanate. The balance is usually soda ash or other alkali metal carbonate with a small proportion, usually less than 1% of cyanide. The evolved gases from the reaction zone advantageously are collected and returned to the process. The gases may be otherwise utilized, for example, by absorption of the ammonia in sulfuric acid to make ammonium sulfate and by recovery of the carbon dioxide as such.

The bicarbonates e. g. sodium bicarbonate and sesquicarbonate may be substituted for the carbonate in the reaction mixture, using molecularly equivalent amounts.

The apparatus employed should be adapted to effect rapid heating and rapid removal of the fused salt from the reaction zone. For example, a solid mixture of the reactants may be fed into the upper part of an inclined heated tube provided with means such as a screw conveyor for moving the solid through the tube as rapidly as possible into the heated center zone of the tube and arranged so that the fused liquid flows immediately into the lower and cooler part of the tube and out of the tube. In this way moisture contained in the starting materials is driven off as the urea melts (85° to 120° C.) and the reaction mixture is rapidly raised to the final fusion temperature just before the point of exit from the reaction zone. In another suitable apparatus, a shallow pan or dish is heated from below by direct fire and a fused mixture is maintained in the dish. The starting mixture or individual components may be sprinkled or otherwise fed at an appropriate rate to the fusion, for example, from a star feeder, and the dish is arranged so that the fluid flows from one edge and out of the reaction zone. A small layer of fusion is maintained in the dish. Other suitable apparatus which makes it possible to heat the reaction mixture and to remove the fusion quickly from the reaction zone may be used. The maximum time limit of 5 minutes in the fused state should, however, not be exceeded for best results.

The apparatus used should be constructed of materials resistant to the reaction mixture at the temperatures employed and which will not promote decomposition of the cyanate. Nickel and alloys containing large proportions of nickel may be used but iron vessels are generally not as satisfactory since they discolor the product. Iron and its compounds appear to catalyze the decomposition of cyanates and prevent the manufacture of the desired product in satisfactory yields. Ceramic vessels may be used but are less satisfactory because of their poor heat transfer characteristics.

Typical operating conditions for obtaining the results of my invention are illustrated in the following examples. Obviously, the examples are not intended to be limiting with respect to the procedure or equipment described.

*Example I*

A powdered mixture of 2.3 moles of urea and one mole of sodium carbonate was added in portions from time to time to a nickel vessel having a spout at the bottom. The powdered mixture was added at such a rate that the beaker was always filled with the solid and it was kept pushed down into the beaker. Heat was supplied to the vessel by means of gas fires and the fusion, as fast as formed, flowed from the spout and into a suitable container. A total of several pounds of mixture was fed through the crucible in this way and the resulting product showed on analysis 92.30 per cent of sodium cyanate and 1.35 per cent of sodium cyanide.

*Example II*

Using a direct fired flat nickel pan about one foot in diameter and arranged with an outlet tube on one side to maintain a melt level of about ⅛-inch in the pan, several runs were made in which a solid mixture of urea and soda ash comprising from 2.3 to 2.9 moles of the former per mole of the latter was fed at rates of 7.5 to 16.1 pounds per hour through a screen onto the surface of the fusion which was maintained at a temperature of 550° C. The residence time in fusion was about 3 minutes. The products of these runs contained an average of about 95-96% NaOCN, about 0.54 to 0.88 per cent NaCN and 2-6 per cent Na₂CO₃. The product was removed from the fusion at the rate of about 5 to 10 pounds per hour.

In contrast to the high yields obtained under these typical operating conditions, only 8.30 per cent sodium cyanate yield was obtained by reacting a 1:1 mole ratio of urea and sodium carbonate in an autoclave for ½ hour at 200° C., and only 36 per cent sodium cyanate yield was obtained by fusing a 2.5:1 mole ratio of urea and sodium carbonate at 185° C. with the completion of frothing which required 10 minutes.

*Example III*

Using a direct-fired pan, having a conical bottom sloped at 20° to the horizontal, and arranged with an outlet tube at the center to carry off the molten product as rapidly as possible to a chilled receiver, several runs were made in which a solid mixture of urea and potash comprising 2.3 moles of the former per mole of the latter was fed at rates of 26.4 to 28.8 pounds per hour through a screen onto the surface of the fusion. The residence time in the fusion pan was thus as short as possible. The products of these runs contained an average of about 92 to 93 per cent KOCN, 0.3 to 0.8 per cent KCN and 5 to 8 per cent $K_2CO_3$. The product was removed from the fusion at about 14 to 17 pounds per hour.

*Example IV*

Using a glass reactor tube, a series of analytical determinations reflecting progress of reaction with time was made for the system 2.3 moles of urea—1 mole of potassium carbonate. The pulverized mix was prefused at 160° C., then repulverized before introduction to the reactor where it was brought to a clear melt at 600° C. The material in all cases was poured into the tube and stirred until fusion occurred. After the desired interval of time, the tube was quickly removed from the bath and the contents poured onto an aluminum tray and allowed to solidify. While still hot, the solidified cyanate was pulverized with mortar and pestle and placed in a screw cap bottle. Portions of each sample were weighed and analyzed for cyanate and cyanide content. The data indicate the cyanide formation is a straight line function of time in the clear melt. By contrast at 350° C., cyanide formation is relatively slow, but cyanate content still reaches a maximum at about 2 to 5 minutes. The data follow:

| Time, minutes | Percent KCNO | Percent KCN |
|---|---|---|
| 1 | 78 | 0.01 |
| 2 | 91 | 0.01 |
| 4 | 89 | 0.022 |
| 6 | 89.5 | 0.062 |
| 10 | 88 | 0.08 |
| 15 | 85.5 | 0.156 |
| 20 | 83 | 0.204 |

*Example V*

A mixture of 73.9 parts of lithium carbonate (1.0 mole) and 150 parts of urea (2.5 moles) was fed into the apparatus of Example I and the liquid product removed as there described. The fusion temperature is about 600° C. A yield of 86.5 per cent of LiOCN was obtained.

*Example VI*

A mixture of 20.5 parts of thiourea and 13.25 parts of anhydrous soda ash was heated rapidly. It first melted at 158° C., partially solidified at 190° C. and produced a clear melt at 305° C. after which it was promptly cooled. A product containing 97.2% of sodium thiocyanate and entirely free from cyanides was obtained in about 64% yield.

*Example VII*

Using the apparatus of Example III, a mixture in the ratio of 2.3 moles of thiourea to 1 mole of soda ash was charged at a rate of about 8.5 pounds per hour. In about 3 hours, a total of 9 pounds of product was obtained, analyzing about 96% NaSCN and 0.1% NaCN.

*Example VIII*

A mixture of 2.3 moles of thiourea and 1 mole of anhydrous potassium carbonate was heated as rapidly as possible. At a temperature of about 150–160° C. the mixture began to melt, $H_2S$ and $CO_2$, were evolved and a clear melt was obtained at about 209° C. The melt was promptly solidified and amounted to 75% by weight of the materials charged. The KSCN content of the mixture was 80.64% and the yield was therefore 93%.

*Example IX*

A mixture of 14.8 parts by weight of lithium carbonate and 38 parts of thiourea (molar ratio, 1:2.5) was heated to 250–300° C. for 20–30 minutes until foaming ceased and a clear melt was obtained. The mixture was then solidified by cooling. The product melted at about 250° C. and contained 0.71% of cyanide.

Thus my invention provides a process for obtaining high quality cyanates and thiocyanates in high yield from a source of urea and a carbonate of an alkali metal. It is characterized by very rapid reaction in the clear molten state but requires rapid removal of the molten product from the reaction zone in order to limit the reaction time in the molten state to not more than about 5 minutes. The molar ratio of the urea starting material to the carbonate also should be limited to between about 2 and 3 to 1. The products then are high in cyanate or thiocyanate content and of minimum harmful cyanide content.

I claim:

1. In the manufacture of alkali metal cyanates, the method which comprises continuously charging a mixture of urea and a carbonate of an alkali metal in the ratio of 2 to 3 moles of urea to one mole of the carbonate to a reaction zone, heating the mixture in the reaction zone to a temperature producing a clear melt, withdrawing the molten material at a rate limiting the reaction in the molten state time to not more than about 5 minutes, cooling the molten material and recovering the product.

2. The method of claim 1 in which the carbonate is potassium carbonate.

3. The method of claim 1 in which the carbonate is lithium carbonate.

4. In the manufacture of alkali metal thiocyanates, the method which comprises continuously charging a mixture of thiourea and a carbonate of an alkali metal in the ratio of 2 to 3 moles of thiourea to one mole of the carbonate to a reaction zone, heating the mixture in the reaction zone to a temperature producing a clear melt, withdrawing the molten material at a rate limiting the reaction in the molten state time to not more than 5 minutes, cooling the molten material and recovering the product.

5. The method of claim 4 in which the carbonate is soda ash.

6. The method of claim 4 in which the carbonate is potassium carbonate.

7. The method of claim 4 in which the carbonate is lithium carbonate.

8. The method which comprises heating from two to three moles of a compound falling within the generic formula $(NH_2)_2CX$ in admixture with one mole of an alkali metal carbonate to a temperature producing a clear melt and limiting the reaction time in the molten state to not more than about 5 minutes, cooling the molten material and recovering therefrom a compound falling within the generic formula MCNX, M being an alkali metal and X being an element selected from the group consisting of oxygen and sulfur.

9. The method which comprises continuously charging a mixture of two to three moles of a compound falling within the generic formula $(NH_2)_2CX$ and one mole of an alkali metal carbonate to a reaction zone, heating the mixture in the reaction zone to a temperature producing a clear melt, withdrawing the molten material at a rate limiting the reaction time in the molten state to not more than about 5 minutes, cooling the molten material and recovering therefrom a compound falling within the generic formula MCNX, M being an alkali metal and X being an element selected from the group consisting of oxygen and sulfur.

References Cited in the file of this patent

UNITED STATES PATENTS

| Number | Name | Date |
| --- | --- | --- |
| 1,915,425 | Kloepfer | June 27, 1933 |
| 1,971,009 | Konig | Aug. 21, 1934 |
| 2,345,826 | Neumark | Apr. 4, 1944 |
| 2,546,551 | Lento, Jr. | Mar. 27, 1951 |

FOREIGN PATENTS

| Number | Country | Date |
| --- | --- | --- |
| 339,220 | Great Britain | Dec. 4, 1930 |
| 339,371 | Great Britain | Dec. 11, 1930 |
| 359,559 | Great Britain | Oct. 26, 1931 |
| 39,282 | France | Oct. 12, 1931 |
| 713,520 | France | Oct. 29, 1931 |
| 590,232 | Germany | July 11, 1930 |
| 551,776 | Germany | May 12, 1932 |

OTHER REFERENCES

Scattergood: "Inorganic Synthesis" by Fernelius, vol. II, pages 86–89, McGraw-Hill Book Co., N. Y. C. (1946).